United States Patent
Prexl et al.

(10) Patent No.: US 7,595,616 B2
(45) Date of Patent: Sep. 29, 2009

(54) CONTROL CIRCUIT FOR A POLARITY INVERTING BUCK-BOOST DC-DC CONVERTER

(75) Inventors: Franz Prexl, Niederding (DE); Kevin Scoones, Dallas, TX (US); Stefan Reithmaier, Vilsheim (DE)

(73) Assignee: Texas Instruments Deutschland GmbH, Freising (DE)

( * ) Notice: Subject to any disclaimer, the term of this patent is extended or adjusted under 35 U.S.C. 154(b) by 292 days.

(21) Appl. No.: 11/132,899

(22) Filed: May 19, 2005

(65) Prior Publication Data

US 2006/0012355 A1    Jan. 19, 2006

(30) Foreign Application Priority Data

May 28, 2004   (DE) .................. 10 2004 026 710

(51) Int. Cl.
*G05F 1/00* (2006.01)
(52) U.S. Cl. ..................................... 323/280
(58) Field of Classification Search ................. 323/265, 323/268, 273, 280, 281, 159, 344
See application file for complete search history.

(56) References Cited

U.S. PATENT DOCUMENTS

| | | | |
|---|---|---|---|
| 6,825,644 B2 * | 11/2004 | Kernahan et al. | 323/283 |
| 2005/0088151 A1 * | 4/2005 | Tzeng et al. | 323/268 |
| 2006/0049811 A1 * | 3/2006 | Farkas | 323/268 |

* cited by examiner

*Primary Examiner*—Edward Tso
*Assistant Examiner*—Ramy Ramadan
(74) *Attorney, Agent, or Firm*—John J. Patti; Wade J. Brady, III; Frederick J. Telecky, Jr.

(57) ABSTRACT

A control circuit for a polarity inverting buck-boost DC-DC converter, includes an operational trans-conductance amplifier that has inputs to which a sensed voltage difference signal is applied and an output connected to an input of a voltage-to-duty-cycle converter. A compensation capacitance is connected between the output of the amplifier and a fixed supply terminal. The compensation capacitance includes a first capacitor that is permanently connected between the output of the amplifier and the fixed supply terminal and a second capacitor that has a switched connection between the output of the amplifier and the fixed supply terminal. The first capacitor has a small capacitance compared to the second capacitor. The switched connection of the second capacitor is controlled by a continuous-discontinuous mode detection circuit.

13 Claims, 2 Drawing Sheets

CONTROL CIRCUIT FOR A POLARITY INVERTING BUCK-BOOST DC-DC CONVERTER

CROSS REFERENCE TO RELATED APPLICATIONS

This application claims priority under 35 U.S.C. §119 of German Application Serial No. 10 2004 026710.3, filed May 28, 2004.

FIELD OF THE INVENTION

The present invention relates to a control circuit for a polarity inverting buck-boost DC-DC converter in CMOS technology.

BACKGROUND OF THE INVENTION

A polarity inverting buck-boost DC-DC converter is one that converts a DC input to a DC output of lower or higher voltage level and opposite polarity with respect to the DC input. Conventionally, a voltage mode converter of this kind includes three regulation and control circuits that act in parallel to maintain an output voltage at the desired level. Each of these circuits contributes to a charge current for a capacitor that is connected to a first input of an operational amplifier the second input of which is connected to a reference voltage source. The output of the operational amplifier is a pulse signal with a variable duty cycle. A first circuit supplies a current contribution in response to the sensed voltage difference between the input and output of the converter. A second circuit supplies a current contribution in response to a voltage difference sensed between the output voltage and a reference voltage and includes a compensation capacitor. The compensation capacitor delays the action of the second circuit. A third circuit also supplies a current contribution in response to a voltage difference sensed between the output voltage and a reference voltage. The third circuit makes a smaller, but faster, contribution to the charge current. This regulation concept is a compromise between fast transient response and stability.

For this second control circuit, a relatively large compensation capacitor usually is needed in continuous mode of the converter. The high capacitance of a large compensation capacitor, however, makes load regulation very bad in discontinuous mode of the converter. As is known, the inductor current increases in the ON phase and decreases in the OFF phase of each clock cycle. In the continuous mode, the inductor current never decreases to zero in the OFF phase. When the average inductor current gets small, and the inductor current reaches zero in the OFF phase and remains zero to the end of the OFF phase. This is called the discontinuous mode. There are solutions that do not allow discontinuous mode, but all these solutions accept reduced efficiency in the discontinuous mode.

Also, it is not possible to implement such a circuit in a polarity inverting buck-boost converter, because only PMOS devices can be applied to a negative voltage and these have to be controlled by negative voltages without any NMOS transistors. There is no acceptable solution for this problem.

SUMMARY OF THE INVENTION

The present invention mainly relates to the second out of the three control circuits.

The present invention assumes that in discontinuous mode, a smaller capacitor would be sufficient to achieve stability. Accordingly, the invention proposes to switch between a high capacitance for the continuous mode and low capacitance for the discontinuous mode of the converter. Load regulation becomes much better since the small capacitor can be charged much faster in discontinuous mode.

In order to avoid significant transition problems, the voltage across the large capacitor has to have the correct start value whenever it is switched back into the regulation loop again.

A fast but low power buffer amplifier is also proposed to be used in the preferred embodiment of the invention. The buffer amplifier ensures that the voltage across the large capacitor always follows the voltage across the small capacitor. This avoids any problem on switching back to the continuous mode. The small capacitor is connected permanently so that its voltage is correct anyway at the transition to discontinuous mode.

DETAILED DESCRIPTION OF THE DRAWINGS

Figure 1:
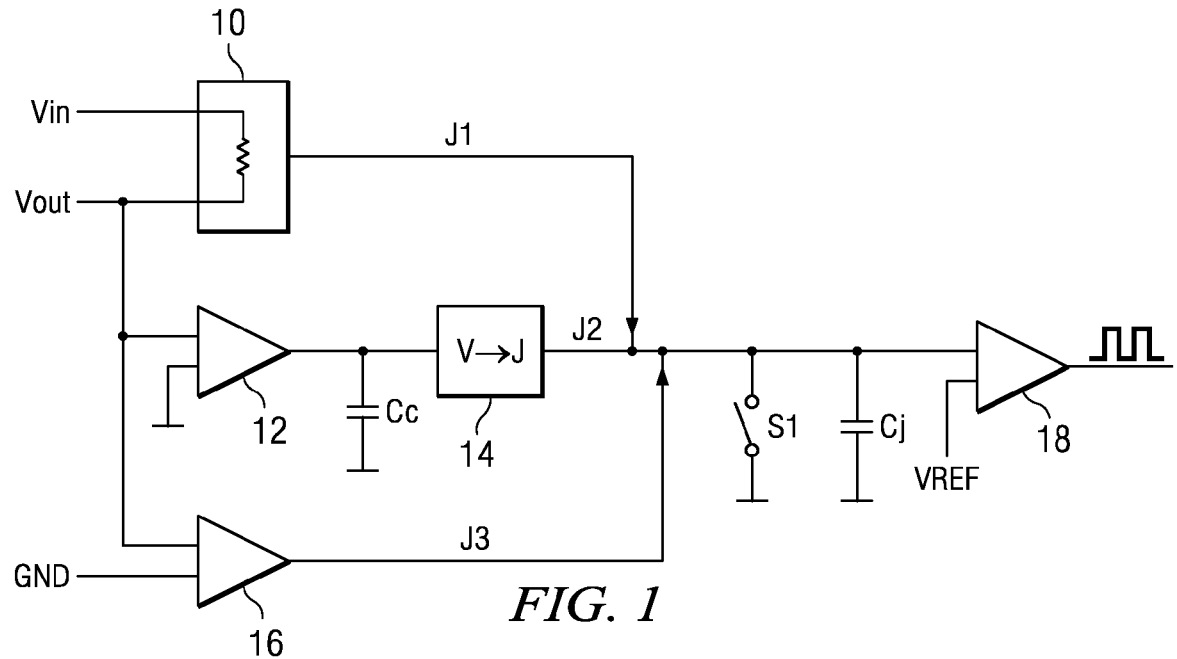
FIG. 1 is a block diagram of a polarity inverting buck-boost DC-DC converter.

With reference to FIG. 1, the converter shown therein includes a first control circuit 10 that supplies a charge current J1 in response to a voltage difference sensed between input terminals Vin and Vout. A second control circuit includes an operational trans-conductance amplifier 12 that has inputs connected to terminal Vout and to ground, respectively, and an output connected to an input of a voltage/current converter 14. A compensation capacitor Cc is connected from the interconnection node of amplifier 12 and converter 14 to ground. Voltage/current converter 14 supplies a current J2. A third control circuit comprises an error amplifier 16 that has inputs connected to terminal Vout and to ground GND, respectively, and an output that supplies a current J3.

Currents J1, J2 and J3 add up to a charge current for a capacitor Cj connected between a first input of an operational amplifier 18 and ground. A switch S1 controlled by a pulse generator of fixed frequency (not shown) is connected across capacitor Cj. The second input of amplifier 18 is connected to a reference voltage source VREF. The output of amplifier 18 is a pulse signal with a duty cycle which is adjusted by the three control loops to keep the output voltage of the converter on the desired level.

Figure 2:
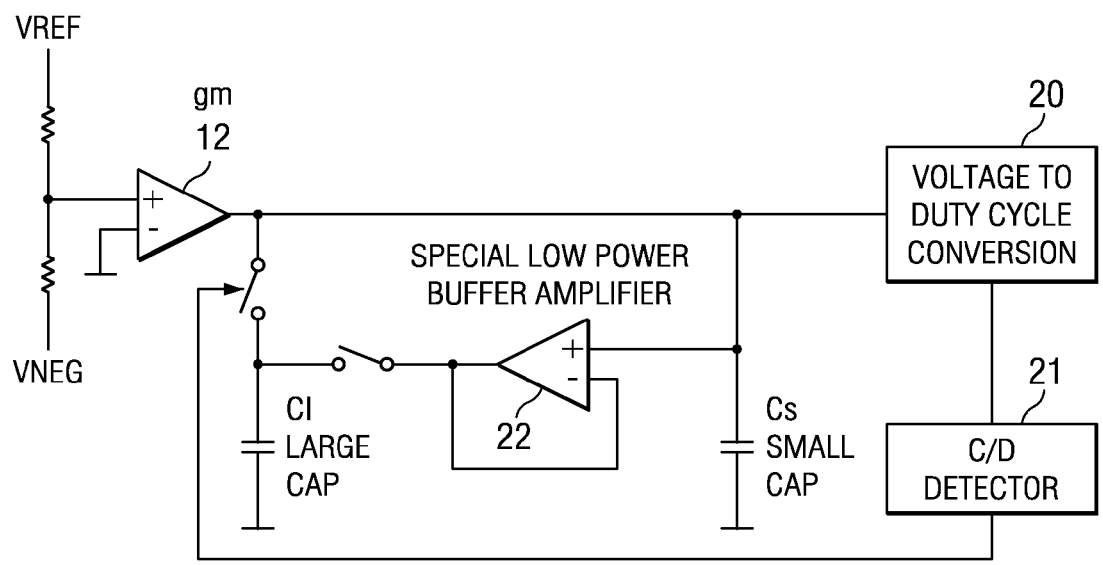
FIG. 2 is a block diagram of a control circuit for the converter in FIG. 1.

As seen in FIG. 2, the operational trans-conductance amplifier 12 has a first input connected to ground and a second input connected to the resistive voltage divider connected between terminals VREF and VNEG (negative output). The output of amplifier 12 is connected to an input of a voltage-to-duty cycle converter 20, and a compensation capacitance is connected from the output of amplifier 12 to ground. The compensation capacitance here is composed of a small capacitor Cs and a relatively large capacitor C1. Only the small capacitor Cs is permanently connected from the output of amplifier 12 to ground. The larger capacitor C1 is connected through a switch S2. The switch S2 is controlled by a continuous/discontinuous mode detection circuit 21. A buffer amplifier 22 formed by the differential amplifier of FIG. 3 has a noninverting input connected to capacitor Cs and an output looped back to the inverting input and connected to capacitor C1. Accordingly, amplifier 22 has gain 1 so that the voltage at capacitor C1 closely traces that at capacitor Cs.

Figure 3:
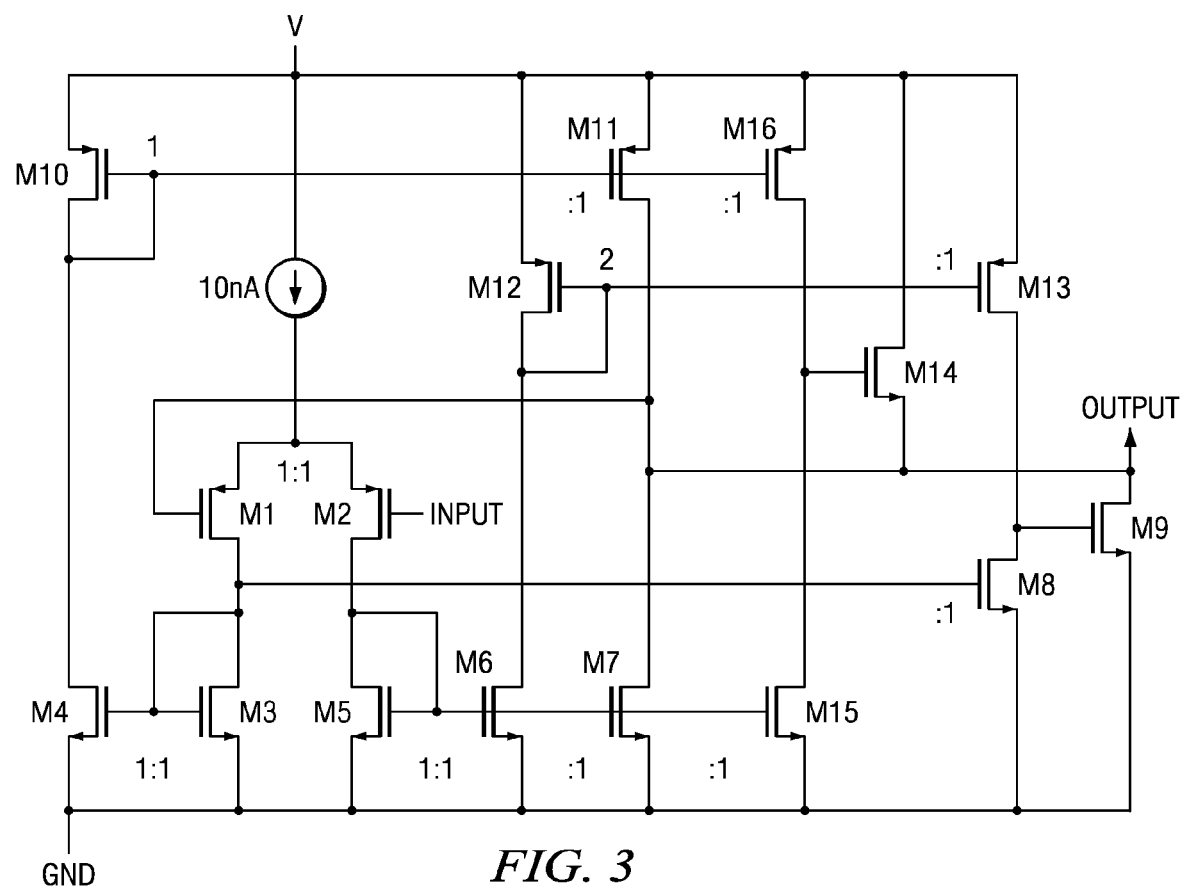
FIG. 3 is a circuit diagram of a buffer amplifier used in the control circuit.

The voltage across the compensation capacitor has to rise when the load increases and falls on the way to discontinuous mode. The buffer amplifier shown in FIG. 3 is very fast but does not have the usual drawback of high current consumption. The idea is to implement a dead zone where both output transistors M9 and M14 are definitely off to avoid cross-current between the supply terminals. As a result, the amplifier is very fast, but has an offset or a range where the output is almost in a high impedance state. But this is no problem if the offset realized in the current manner. It has to be negative. On the way from discontinuous to continuous mode of the converter, the voltage across the large capacitor perfectly follows the voltage across the small capacitor. Even if the voltage across the small capacitor is not perfectly stable or noisy, the amplifier output forces the large capacitor voltage to the peak voltage. Thus the voltage across the large capacitor is either correct or a bit too high which is just an additional benefit into the right direction. This concept has proven to work fine down to fast load changes in the 100 µs range.

Due to this concept, it is possible to use a polarity inverting buck-boost converter in continuous and discontinuous mode in a variety of applications.

With reference now to FIG. 3, the buffer amplifier 22 includes a differential input stage with transistors M1 and M2 the interconnected sources of which are connected to a common current source S which, in the particular example provides a current of 10 nA from supply terminal V. The drains of transistors M1 and M2 are connected to ground GND via diode-connected transistors M3 and M5, respectively. The gate of transistor M1 is connected to the output of the amplifier, and the gate of transistor M2 is the non-inverting input of the amplifier. Transistor M4, series-connected with diode-connected transistor Mb, mirrors the current through transistor M3, and transistors M6, M7, M15 are connected as current mirrors with respect to the current through transistor M5. Transistor M6, however, is connected in series with diode-connected transistor M12, which is of twice the dimension of transistor M13. The current through transistor M12 is again mirrored by transistor M13 connected in series with transistor M8 between supply terminal V and ground GND. Transistor M8 has its gate connected to the drain of transistor M1 and its drain connected to the gate of a large transistor M9 which has its drain connected to the output of the amplifier and its source connected to ground GND. Another large transistor M14 is connected between supply terminal V and the output of the amplifier and has its gate connected to a node connecting the drains of transistors M15 and M16 connected in series between supply terminal V and ground GND. Transistor M16 has its gate connected to the gate of transistor Mb, just as transistor M11 which has its source connected to supply terminal V and its drain connected to the output of the amplifier. Transistor M7 also has its drain connected to the output of the amplifier.

In operation of the buffer amplifier in FIG. 3, either transistor M14 or transistor M9 is conducting, each of which has a high current capacity due to its size.

The invention claimed is:
1. An apparatus comprising:
  an operational trans-conductance amplifier that has inputs to which a sensed voltage difference signal is applied and an output connected to an input of a voltage-to-duty-cycle converter;
  a compensation capacitance connected between the output of the amplifier; and a fixed supply terminal, wherein the compensation capacitance includes:
    a first capacitor that is permanently connected between the output of the amplifier and the fixed supply terminal; and
    a second capacitor that has a switched connection between the output of the amplifier and the fixed supply terminal, the first capacitor having a small capacitance compared to the second capacitor, and the switched connection of the second capacitor being controlled by a continuous-discontinuous mode detection circuit.

2. The apparatus of claim 1, and further comprising a buffer amplifier with an input connected to the first capacitor and an output connected to the second capacitor.

3. The apparatus of claim 2, wherein the buffer amplifier has an output stage with two MOS output transistors each connected between the output and one of two supply terminals, and a biasing circuit that drives both output transistors so that only one of the two is conductive at a time.

4. An apparatus comprising:
  a first control circuit that senses the voltage difference between a first and a second terminal;
  an error amplifier that is coupled to the second terminal and ground;
  a first amplifier that is coupled to the second terminal and ground;
  a compensation capacitance that is coupled to the first amplifier, wherein the compensation capacitance receives an output from the first amplifier, and wherein the compensation capacitance includes:
    a first capacitor that is coupled to the first amplifier;
    a first switch coupled to the first amplifier and the first capacitor;
    a continuous-discontinuous mode detection circuit that controls the switch; and
    a second capacitor coupled to the first switch, wherein the first capacitor has a lower capacitance than the second capacitor; and
  a voltage-to-current converter that is coupled to the compensation capacitance;
  a summing node that receives currents from the voltage-to-current converter, the first control circuit, and the error amplifier;
  a switched capacitance coupled to the summing node; and
  a second amplifier coupled to the switched capacitance.

5. The apparatus of claim 4, wherein the compensation capacitance further comprises a voltage-to-duty cycle conversion circuit that is coupled to the first capacitor and the first switch, wherein the voltage-to-duty cycle conversion circuit outputs a signal to the continuous-discontinuous mode detection circuit.

6. The apparatus of claim 4, wherein the compensation capacitance further comprises a second amplifier with an input coupled to the first capacitor and an output coupled to the second capacitor.

7. The apparatus of claim 6, wherein the second amplifier has an output stage with two MOS output transistors each coupled between the output and one of two supply terminals, and a biasing circuit that drives both output transistors so that only one of the two is conductive at a time.

8. The apparatus of claim 4, wherein the switched capacitance further comprises:
  a second switch coupled between the summing node and ground; and a third capacitance that is coupled generally in parallel to the second switch.

9. An apparatus comprising:

an input circuit coupled to a first terminal, a second terminal, and ground;

a first amplifier that is coupled to the second terminal and ground;

a compensation capacitance that is coupled to the first amplifier, wherein the compensation capacitance receives an output from the first amplifier, and wherein the compensation capacitance includes:

a first capacitor that is coupled to the first amplifier;

a first switch coupled to the first amplifier and the first capacitor;

a continuous-discontinuous mode detection circuit that controls the switch;

a second capacitor coupled to the first switch, wherein the first capacitor has a lower capacitance than the second capacitor;

a voltage-to-duty cycle conversion circuit that is coupled to the first capacitor and the first switch, wherein the voltage-to-duty cycle conversion circuit outputs a signal to the continuous-discontinuous mode detection circuit;

a second amplifier with an input coupled to the first capacitor and an output coupled to the second capacitor; and an output circuit coupled to the compensation capacitance and the input circuit.

10. The apparatus of claim 9, wherein the input circuit further comprises:

a first control circuit that senses the voltage difference between the first and second terminals; and an error amplifier that is coupled to the second terminal and ground.

11. The apparatus of claim 9, wherein the output circuit further comprises:

a voltage-to-current converter that is coupled to the compensation capacitance;

a summing node that receives currents from the voltage-to-current converter, the first control circuit, and the error amplifier;

a switched capacitance coupled to the summing node; and a second amplifier coupled to the switched capacitance.

12. The apparatus of claim 11, wherein the switched capacitance further comprises:

a second switch coupled between the summing node and ground; and a third capacitance that is coupled generally in parallel to the second switch.

13. The apparatus of claim 9, wherein the second amplifier has an output stage with two MOS output transistors each coupled between the output and one of two supply terminals, and a biasing circuit that drives both output transistors so that only one of the two is conductive at a time.

* * * * *

UNITED STATES PATENT AND TRADEMARK OFFICE
CERTIFICATE OF CORRECTION

PATENT NO. : 7,595,616 B2
APPLICATION NO. : 11/132899
DATED : September 29, 2009
INVENTOR(S) : Prexl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Twenty-eighth Day of September, 2010

David J. Kappos
*Director of the United States Patent and Trademark Office*